(12) United States Patent
Joshi et al.

(10) Patent No.: US 10,174,659 B2
(45) Date of Patent: Jan. 8, 2019

(54) SWITCHABLE RADIATIVE ENERGY HARVESTING SYSTEMS

(71) Applicant: Toyota Motor Engineering & Manufacturing North America, Inc., Erlanger, KY (US)

(72) Inventors: Shailesh N. Joshi, Ann Arbor, MI (US); Debasish Banerjee, Ann Arbor, MI (US); Shashi Honnikoppa, Ann Arbor, MI (US)

(73) Assignee: TOYOTA MANUFACTURING ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 53 days.

(21) Appl. No.: 15/205,018

(22) Filed: Jul. 8, 2016

(65) Prior Publication Data
US 2018/0010505 A1    Jan. 11, 2018

(51) Int. Cl.
| | |
|---|---|
| *F01N 3/00* | (2006.01) |
| *F01N 5/02* | (2006.01) |
| *H02S 10/30* | (2014.01) |
| *F02D 41/06* | (2006.01) |
| *G02F 1/153* | (2006.01) |
| *G02F 1/01* | (2006.01) |
| *G02F 1/15* | (2006.01) |
| *F01N 9/00* | (2006.01) |
| *F02D 41/02* | (2006.01) |

(52) U.S. Cl.
CPC ............... *F01N 5/02* (2013.01); *F01N 9/00* (2013.01); *F02D 41/064* (2013.01); *G02F 1/0147* (2013.01); *G02F 1/153* (2013.01); *G02F 1/1523* (2013.01); *H02S 10/30* (2014.12); *F01N 2240/04* (2013.01); *F01N 2240/10* (2013.01); *F01N 2260/20* (2013.01); *F02D 41/0255* (2013.01); *F02D 2200/021* (2013.01)

(58) Field of Classification Search
USPC ......... 60/274, 276, 277, 286, 299, 300, 303, 60/275; 359/241, 242, 244, 245, 359/265–275, 288, 320
See application file for complete search history.

(56) References Cited

U.S. PATENT DOCUMENTS

| | | | |
|---|---|---|---|
| 5,512,108 A * | 4/1996 | Noreen | B01D 53/32 136/253 |
| 6,246,505 B1 * | 6/2001 | Teowee | B32B 17/10036 359/241 |
| 6,318,077 B1 | 11/2001 | Claypole et al. | |

(Continued)

*Primary Examiner* — Binh Q Tran
(74) *Attorney, Agent, or Firm* — Dinsmore & Shohl, LLP

(57) ABSTRACT

Switchable radiative energy harvesting systems and methods of harvesting radiation are disclosed. A system includes an optical filter that includes at least one of an active material and a passive material. The optical filter is switchable between a shield mode and a harvesting mode such that the at least one of the active material and the passive material is in a reflecting state during the shield mode such that the optical filter blocks passage of radiation from a thermal emitter to a thermophotovoltaic cell and a transmitting state during the harvesting mode such that that the optical filter allows the radiation to pass from the thermal emitter to the thermophotovoltaic cell.

20 Claims, 8 Drawing Sheets

(56) References Cited

U.S. PATENT DOCUMENTS

| | | | |
|---|---|---|---|
| 7,016,789 B2* | 3/2006 | Stedman | G01M 15/108 |
| | | | 702/24 |
| 7,178,332 B2 | 2/2007 | Sasaki | |
| 7,467,513 B2 | 12/2008 | Sasaki et al. | |
| 8,661,800 B2 | 3/2014 | Levin et al. | |
| 2002/0141029 A1* | 10/2002 | Carlson | G02B 26/02 |
| | | | 359/244 |
| 2003/0223918 A1 | 12/2003 | Cammy et al. | |
| 2005/0268598 A1 | 12/2005 | Yang et al. | |
| 2008/0245590 A1 | 10/2008 | Yonak et al. | |
| 2010/0259698 A1* | 10/2010 | Powers | C09K 19/02 |
| | | | 349/20 |
| 2010/0315693 A1* | 12/2010 | Lam | G02B 5/23 |
| | | | 359/241 |
| 2013/0278989 A1* | 10/2013 | Lam | B60J 3/04 |
| | | | 359/275 |

\* cited by examiner

SWITCHABLE RADIATIVE ENERGY HARVESTING SYSTEMS

TECHNICAL FIELD

The present specification generally relates to vehicle systems that recycle exhaust gases and, more specifically, to a system that recycles energy from the exhaust manifold catalyst during a cold start.

BACKGROUND

The temperature of exhaust gases from an internal combustion engine (including, but not limited to, gases that are about 900° C.) may be utilized as a radiation source for harvesting energy. Existing systems and methods for harvesting the energy from the exhaust gases may include using the radiation energy to warm up engine coolant. However, such systems and methods are not suitable in situations where the ambient temperature (e.g., the temperature surrounding the vehicle and/or the components thereof) is cold (e.g., less than about 0° C.), as the catalytic convertor of the vehicle needs to light-off (e.g., activated) in a short period of time to control vehicle emissions. One such solution may include harvesting energy during the cold start, but this prolongs the converter light-off to meet emissions standards, which wastes valuable energy.

Accordingly, a need exists for harvesting exhaust gases during a cold start that does not prolong the converter light-off, does not waste energy, and meets emissions standards.

SUMMARY

In one embodiment, a switchable radiative energy harvesting system includes an optical filter that includes at least one of an active material and a passive material. The optical filter is switchable between a shield mode and a harvesting mode such that the at least one of the active material and the passive material is in a reflecting state during the shield mode such that the optical filter blocks passage of radiation from a thermal emitter to a thermophotovoltaic cell and a transmitting state during the harvesting mode such that that the optical filter allows the radiation to pass from the thermal emitter to the thermophotovoltaic cell.

In another embodiment, a method of harvesting radiation from one or more components of a vehicle includes determining that an engine of the vehicle is undergoing a cold start, activating a shield mode on a switchable radiative energy harvesting system such that radiation from a thermal emitter component of the vehicle is used to achieve light-off of a catalytic convertor, and when light-off of the catalytic convertor is achieved, switching from the shield mode to a harvesting mode such that the radiation from the thermal emitter is passed to a thermophotovoltaic cell, the thermophotovoltaic cell obtaining energy from the radiation.

In yet another embodiment, a system includes a thermal emitter, a thermophotovoltaic cell, and a switchable radiative energy harvesting system positioned between the thermal emitter and the thermophotovoltaic cell. The switchable radiative energy harvesting system includes a first contact, a second contact, an electrical conductor electrically coupled between the first contact and the second contact, and an optical filter having an active material and a passive material. The optical filter is switchable between a shield mode and a harvesting mode such that the active material and the passive material are in a reflecting state during the shield mode such that the optical filter blocks passage of radiation from the thermal emitter to the thermophotovoltaic cell and a transmitting state during the harvesting mode such that that the optical filter allows the radiation to pass from the thermal emitter to the thermophotovoltaic cell.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
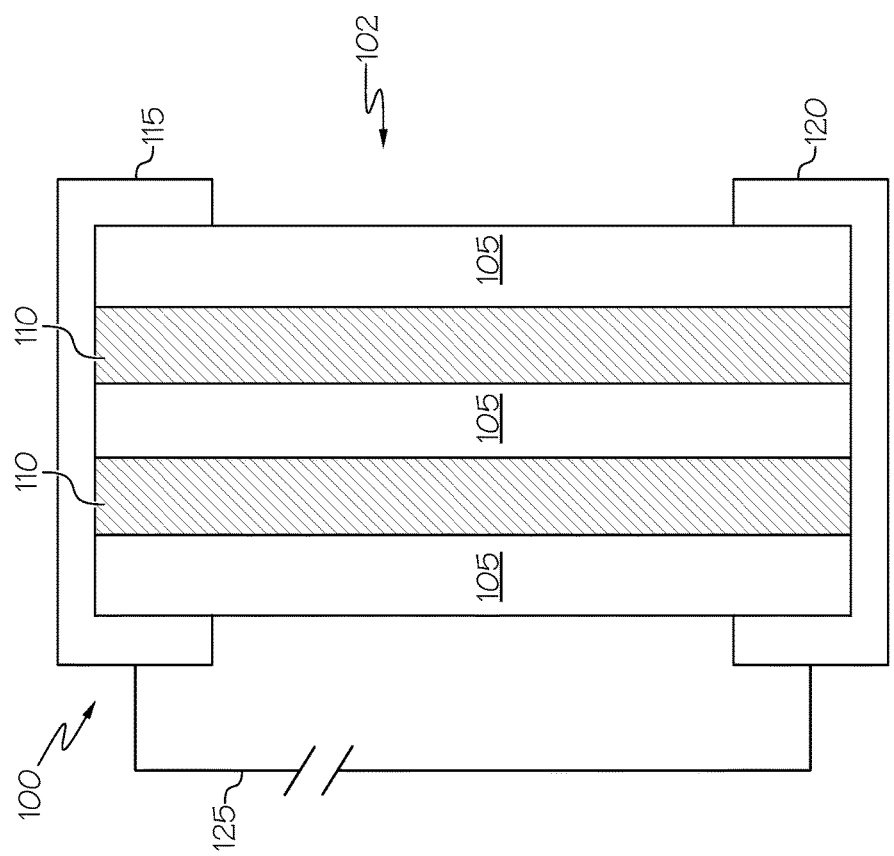
FIG. 1 depicts a schematic view of an illustrative switchable radiative energy harvesting system according to one or more embodiments shown and described herein.

The embodiments described herein are generally directed to a radiative energy harvesting system that can be selectively switched between a shield mode and a harvesting mode to efficiently utilize and/or recycle the thermal energy generated from the vehicle's exhaust without any detrimental effects on the vehicle's emissions. That is, the system allows energy to be used for the purposes of light-off and begins harvesting the remaining energy after light-off occurs. The system described herein can be switched between modes using active materials and/or passive materials that can be switched between a transmitting state and a reflecting state.

While the embodiments described herein generally relate to an internal combustion engine in a vehicle, the present application is not limited to such. That is, other applications of the radiative energy harvesting system that do not incorporate an internal combustion engine and/or a vehicle are contemplated. For example, the radiative energy harvesting system may be utilized with any thermal energy producing device where it may be desirable to switch between a shield mode and a harvesting mode.

As used herein, the term "cold start" refers to the starting (e.g., cranking, initial ignition, and/or running) of an internal combustion engine after the engine has not been operated for at least a particular period of time and/or when an engine temperature immediately prior to being started is at or below a threshold temperature. The particular period of time is not limited by this disclosure and may generally be any period of time, such as, for example, 2 hours or greater. Similarly, the threshold temperature is not limited by this disclosure, and may generally be any temperature. In a nonlimiting example, the threshold may be from about −100° C. to about 1000° C., including about −100° C., about 0° C., about 100° C., about 200° C., about 300° C., about 400° C., about 500° C., about 600° C., about 700° C., about 800° C., about 900° C., about 1000° C., or any value or range between any two of these values (including endpoints). Other illustrative thresholds include, but are not limited to, about 50° C., about 40° C., about 30° C., about 20° C., about 10° C., about 0° C., about −10° C., about −20° C., about −30° C., or any value or range between any two of these values (including endpoints). In some embodiments, a cold start may occur when the engine temperature is at or below 0° C.

The term "light-off" as used herein relates specifically to a catalyst light-off (CLO) of an exhaust system. That is, "light-off" refers to the quick heating of a catalyst of an exhaust system. A catalyst has an associated temperature operating range in which the catalyst is effective in reducing tailpipe hydrocarbons, carbon monoxide, and oxides of nitrogen emissions. Illustrative light-off temperatures may be, but are not limited to, greater than about 750° C., greater than about 900° C., or from about 900° C. to about 1300° C. By quickly heating the catalyst to a temperature within the temperature operating range, tailpipe emissions may be minimized.

The term "optical filter" as used herein refers to a component that selectively allows thermal radiation to pass therethrough. For example, the optical filter as used herein may be switched between a shield mode and a harvesting mode. In the shield mode, the optical filter may shield (i.e., block) thermal radiation from passing therethrough. In contrast, in the harvesting mode, the optical filter may allow thermal radiation to pass therethrough.

FIG. 1 depicts an illustrative radiative energy harvesting system 100. The radiative energy harvesting system 100 switches between a shield mode and a harvesting mode by using components that switch between a transmitting state (harvesting mode) and a reflecting state (shield mode).

The radiative energy harvesting system 100 generally includes an optical filter 102 having optical filter material therein. The optical filter 102 includes active material 105 and/or passive material 110 positioned between a first contact 115 and a second contact 120. In some embodiments, the optical filter 102 may only include the active material 105 positioned between the first contact 115 and the second contact 120. In other embodiments, the optical filter 102 may only include the passive material 110 positioned between the first contact 115 and the second contact 120. In embodiments where the radiative energy harvesting system 100 comprises active material 105 and passive material 110, such materials 105, 110 may be layered between one another as an optical filter stack, as depicted in FIG. 1. Use of both the active material 105 and the passive material 110 as material for the optical filter 102 may allow for a greater configurability of the radiative energy harvesting system 100, as well as a stronger response when switching between shield and harvesting modes, as described in greater detail herein.

The first contact 115 and the second contact 120 may generally be structural members or devices integrated within structural members. The first contact 115 and the second contact 120 may be positioned in any manner so long as the optical filter 102 is positioned between the first contact 115 and the second contact 120. In a nonlimiting example, the first contact 115 may be an upper member (i.e., positioned above the optical filter 102) and the second contact 120 may be a lower member (i.e., positioned below the optical filter 102). In another nonlimiting example, the first contact 115 may be a first side member and the second contact 120 may be a second side member that are positioned on either side of the optical filter 102. In embodiments where the first contact 115 and the second contact 120 are structural members, the first contact 115 and the second contact 120 may function to hold the optical filter 102 in a held position, and may further structurally couple the optical filter 102 to various other components of the radiative energy harvesting system 100. In some embodiments, the first contact 115 and the second contact 120 may contain an electrically conductive material such that an electrical current can be passed between the first contact 115 and the second contact 120, as described in greater detail herein.

The active material 105 consists generally of materials that must receive an external stimulus to activate the active material 105 and switch between a transmitting state and a reflecting state such that the transmitting state allows radiation to pass through the materials and the reflecting state causes the radiation to be reflected. For example, the active material 105 may be electrically activated by application of an electrical current, such as an electrical current that runs via an electrical conductor 125 between the first contact 115 and the second contact 120. Application of the electrical current may switch the material between the transmitting state and the reflecting state, whereas discontinuing the electrical current will have the reverse effect. An illustrative material that may be used for the active material 105 may include, but is not limited to, an electrochromic material. Illustrative examples of an electrochromic material includes, but is not limited to, an oxide of a transitional metal such as tungsten, niobium, vanadium, titanium, tantalum, nickel, and/or the like, as well as polyaniline, polythiophene, and/or the like. One specific example of an electrochromic material includes nickel oxide (NiO). The electrochromic mechanism of these substances is based on intercalation of mobile ions on interlattice positions of the electrochromic material, resulting in discrete color centers having a material-specific absorption band. To make it easier for the ions to penetrate into the electrochromic material, small ions such as lithium or hydrogen (protons) may be used.

The passive material 110 consists generally of materials that passively switch between the transmitting state and the reflecting state based on various external conditions. For example, the one or more portions of passive material 110 may be activated based on a temperature of the passive material 110, which may correspond to an ambient temperature surrounding the radiative energy harvesting system 100 and/or a component thereof. That is, when the temperature of the passive material 110 rises to a particular threshold, the passive material 110 may switch between the transmitting state and the reflecting state. Similarly, when the temperature of the passive material 110 drops below the particular threshold, the passive material 110 may switch in a reverse manner.

Illustrative materials that may be used for the passive material 110 may include, but are not limited to, thermochromic materials. Illustrative examples of thermochromic materials may include transition metal oxides, such as oxides of metals such as vanadium or titanium, among others. In particular embodiments, a thin film of transition metal-doped vanadium (IV) dioxide ($VO_2$) may be employed as the one or more portions of passive material 110. In other embodiments, other oxides of vanadium, such as vanadium sesquioxide ($V_2O_3$) or vanadium pentoxide ($V_2O_5$) may be employed. Alternatively, some room-temperature semiconductor materials, such as germanium (Ge) or the like, may be employed. Other illustrative materials that may be employed include, but are not limited to, aluminum oxide ($Al_2O_3$), sapphire, beryllium oxide (BeO), samarium nickelate ($SmNiO_3$), titanium oxide ($TiO_3$), a transition metal perovskite, ZnBiTeSe, iron antimonide ($FeSb_2$), as well as narrow bandgap semiconductor materials such as germanium antimony telluride ($Ge_2Sb_2Te_5$), phase change materials such as titanium nitride (TiN), tungsten nitride ($WN_2$), carbon (C), or the like.

Thermochromic materials that may be particularly used as described herein may exhibit a reversible metal-to-semiconductor transition near a critical temperature Tc as a result of an atomic structural rearrangement. For example, Vanadium (IV) oxide ($VO_2$) may have an ability to undergo a fully reversible metal-to-semiconductor phase transition. The conversion of the low temperature monoclinic phase $VO_2$ (M) to the high temperature rutile phase $VO_2$(R) is associated with significant changes in electrical conductivity and optical properties in the near-IR region. $VO_2$(R) is a semimetal, reflecting a wide range of radiation wavelengths. $VO_2$(M) is a semiconductor and reflects considerably less energy. Undoped $VO_2$ may exhibit a semiconductor-to-metal transition (SMT) at a critical temperature Tc of about 68° C. such that $VO_2$ switches between a tetragonal rutile structure exhibiting metallic properties that reflect the incident light signal a monoclinic structure that is transparent to the incident light signal. The switching time of $VO_2$ between the phases may be less than 100 femtoseconds. Such properties of $VO_2$ may advantageously facilitate the use of $VO_2$ as a passive material for switching the radiative energy harvesting system 100 between a shield state and a harvesting state.

As will be appreciated, the transition between the transmitting state and the reflecting state exhibited by the $VO_2$ is thermodynamically reversible. In other words, at room temperature, the $VO_2$ may be configured to transmit the incident radiation when the $VO_2$ is in the semiconductor or transparent state. Alternatively, at a temperature greater than the critical temperature Tc, the $VO_2$ in the metal or reflecting state may be configured to reflect the incident radiation.

Figure 2A:
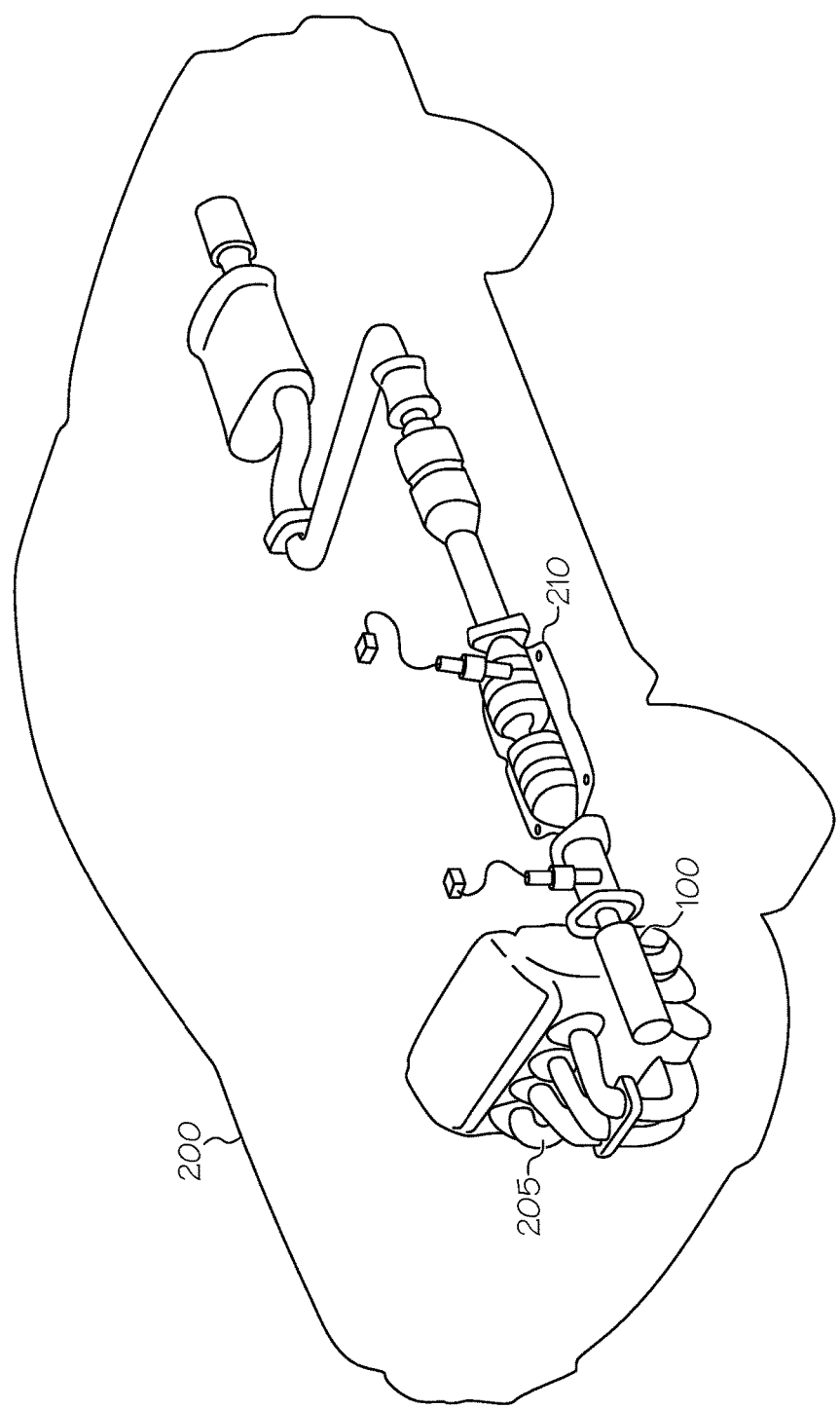
FIG. 2A depicts a schematic view of an illustrative switchable radiative energy harvesting system in a first configuration within a vehicle according to one or more embodiments shown and described herein.
Figure 2B:
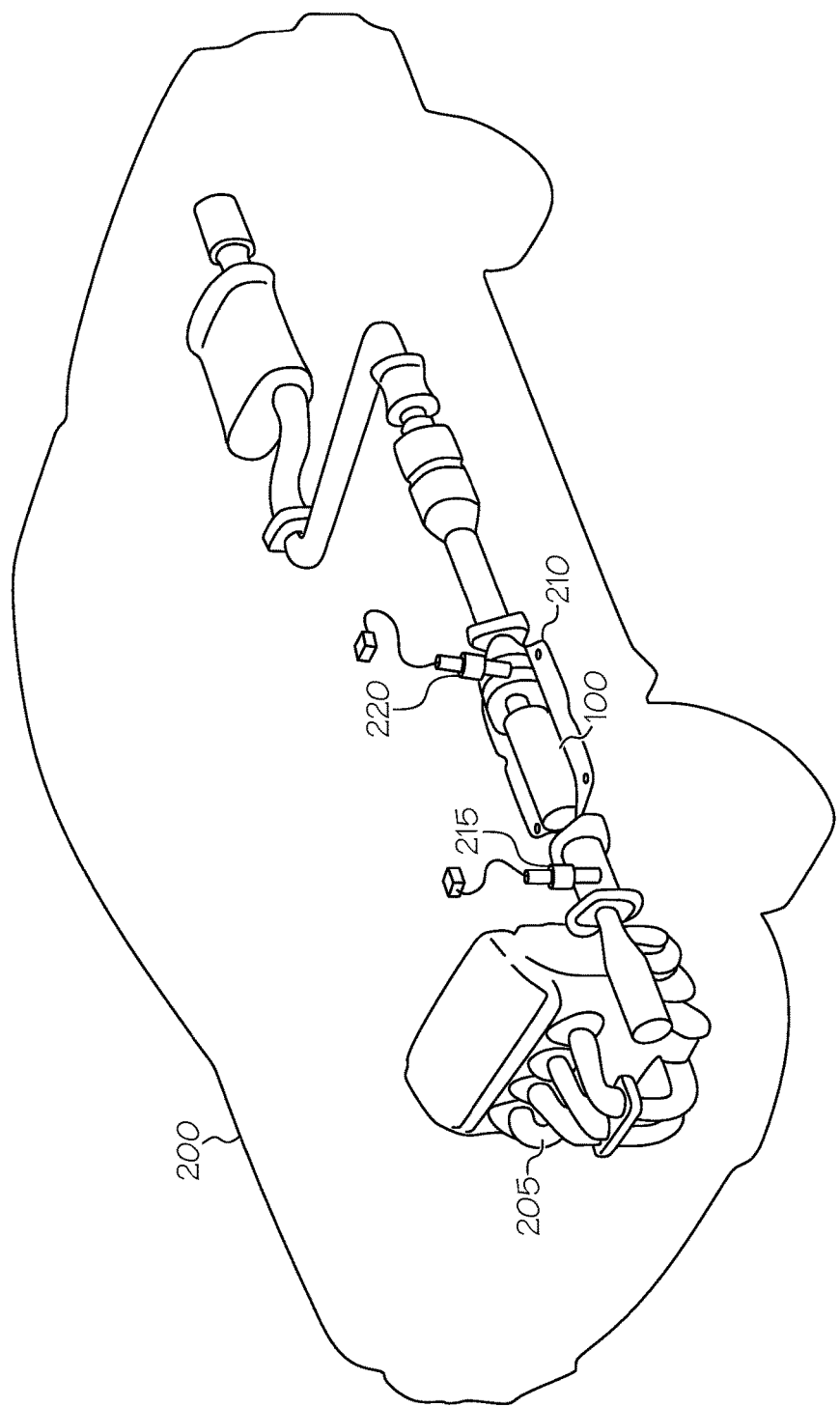
FIG. 2B depicts a schematic view of an illustrative switchable radiative energy harvesting system in a second configuration within a vehicle according to one or more embodiments shown and described herein.

The radiative energy harvesting system 100 may be located in one or more locations with respect to other components of a vehicle 200, as shown in FIGS. 2A and 2B. For example, as shown in FIG. 2A, the radiative energy harvesting system 100 may be coupled upstream from a catalytic convertor 210. That is, the radiative energy harvesting system 100 may be coupled between an exhaust manifold 205 and the catalytic convertor 210 of the vehicle. Alternatively, the radiative energy harvesting system may be integrated with at least a portion of the exhaust manifold 205. In another example, as shown in FIG. 2B, the radiative energy harvesting system 100 may be coupled to and/or integrated with the catalytic convertor 210. In some embodiments, the radiative energy harvesting system 100 may be integrated with at least a portion of the catalytic convertor 210. In some embodiments, the radiative energy harvesting system 100 may be coupled to and/or integrated with the catalytic convertor 210 such that the radiative energy harvesting system 100 is positioned between an upstream oxygen ($O_2$) sensor 215 and a downstream $O_2$ sensor 220. That is, the radiative energy harvesting system 100 may be positioned such that it is downstream from the upstream $O_2$ sensor 215 and upstream from the downstream $O_2$ sensor 220. While not depicted, in another example, the radiative energy harvesting system 100 may be coupled to the catalytic convertor 210 in a location that is downstream from the catalytic convertor 210. Regardless of the location of the radiative energy harvesting system 100 with respect to the various components of the vehicle 200, the radiative energy harvesting system 100 can be installed without modification of the various components to which it is coupled. As such, the various components of the vehicle 200, including, but not limited to, the exhaust manifold 205, the catalytic convertor 210, the upstream $O_2$ sensor 215, and the downstream $O_2$ sensor 220 may be standard, unmodified components as are generally understood.

In operation, the radiative energy harvesting system 100 can be switched between a "shield mode" where radiation is blocked from passing through the radiative energy harvesting system 100 and a "harvesting mode" where radiation is allowed to pass through the radiative energy harvesting system 100. The shield mode may generally be used during cold start conditions and the harvesting mode may be used after the cold start and/or after the convertor light-off occurs.

Figure 3:
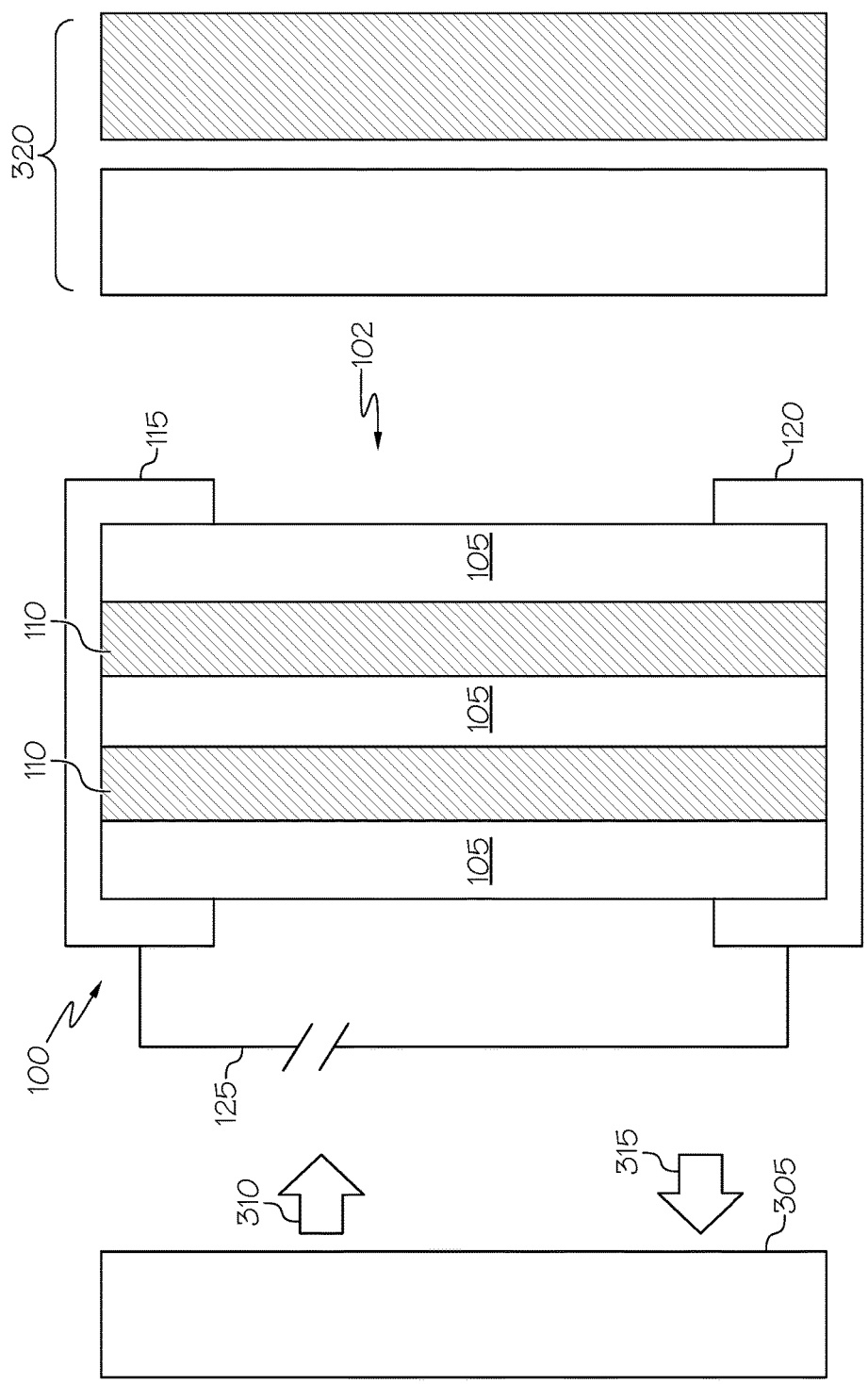
FIG. 3 depicts a schematic view of an illustrative switchable radiative energy harvesting system in a shield mode according to one or more embodiments shown and described herein.

FIG. 3 depicts the radiative energy harvesting system 100 when in a shield mode. In the shield mode, the optical filter 102, including the active material 105 and/or the passive material 110, may be in a reflecting state. As such, radiation emitted by a thermal emitter 305 (indicated by arrow 310) may be reflected by the optical filter 102 of the radiative energy harvesting system 100 (as indicated by arrow 315). As such, thermal radiation is prevented from passing through to a thermophotovoltaic cell (TPV) 320. Reflection of the radiation may ensure that the thermal energy is used to heat the catalyst to ensure light-off occurs as quickly as possible to maintain particular emissions standards.

Figure 4:
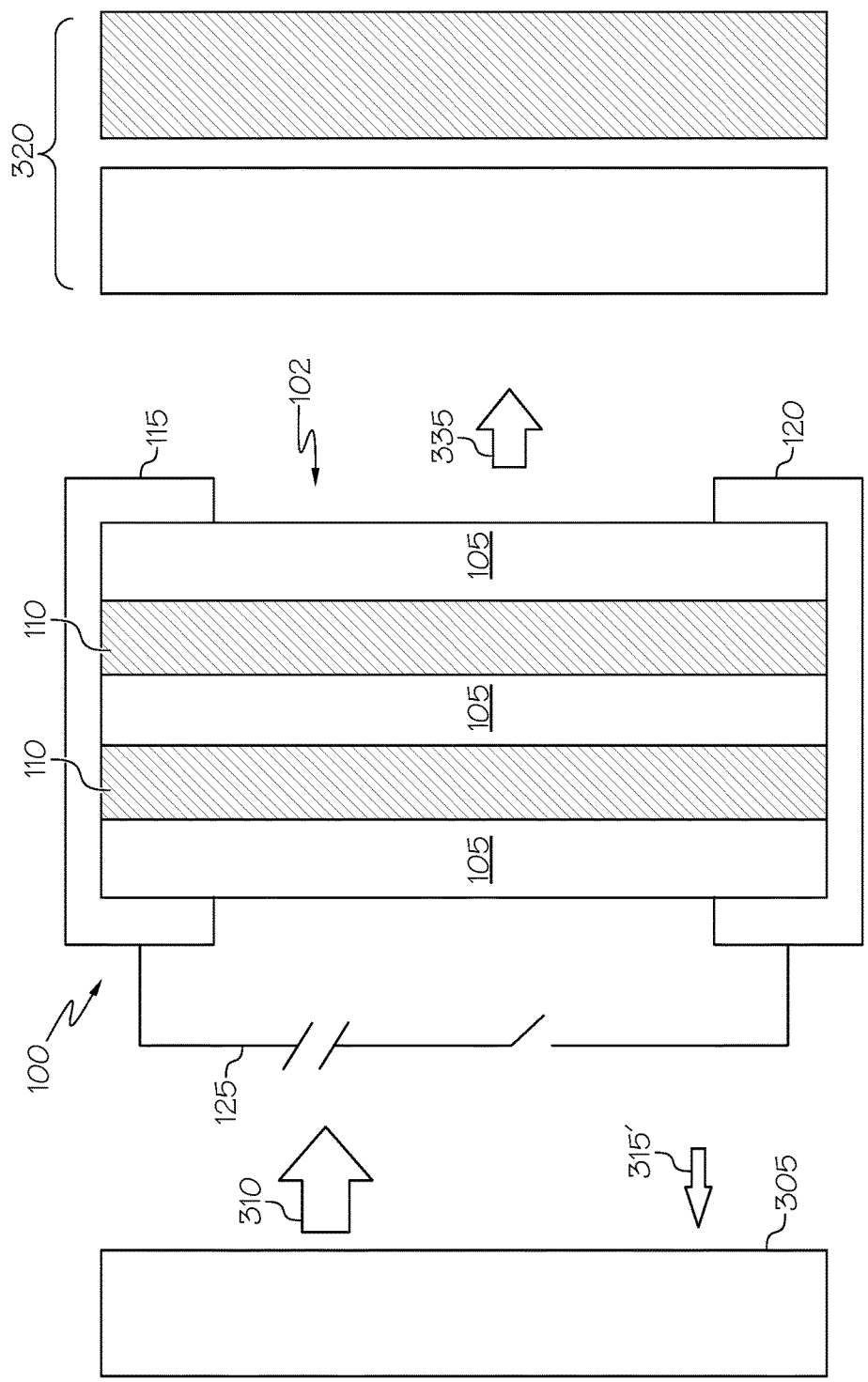
FIG. 4 depicts a schematic view of an illustrative switchable radiative energy harvesting system in a harvesting mode according to one or more embodiments shown and described herein.

In contrast, as shown in FIG. 4, upon switching the optical filter 102 to the transmitting state, the radiation emitted by the thermal emitter 305 (as indicated by arrow 310) may be substantially allowed to pass through the radiative energy harvesting system 100 and captured by the thermophotovoltaic cell 320. In some embodiments, a portion of the radiation emitted by the thermal emitter 305 that is not passed through to the thermophotovoltaic cell 320 may be recycled back to the thermal emitter 305 (as indicated by arrow 315').

The thermal emitter 305 is generally any vehicle component that emits thermal radiation and is thermally coupled to the radiative energy harvesting system 100 such that radiation can be transmitted between the thermal emitter 305 and the radiative energy harvesting system 100. The thermal emitter 305 may further be a vehicle component that is generally recognized as such for vehicle thermophotovoltaic energy conversion systems. In a nonlimiting example, the thermal emitter 305 may be the engine of the vehicle, which emits exhaust gases containing the thermal radiation. As previously described herein, the thermal emitter 305 may be the exhaust manifold or the catalytic convertor of the vehicle, depending on the location of the radiative energy harvesting system 100. The thermal coupling between the thermal emitter 305 and the radiative energy harvesting system 100 may be a thermally conductive conduit or the like, such as, for example, a stainless steel exhaust pipe.

The thermal radiation emitted by the thermal emitter 305 is generally radiation within the infrared (IR) region of the electromagnetic spectrum. As such, the thermal radiation is emitted by the thermal emitter 305 at a wavelength of about 700 nanometers (nm) to about 1 millimeter (mm). The temperature of the thermal radiation emitted by the thermal emitter may be greater than about 750° C., greater than about 900° C., or about 900° C. to about 1300° C., including about 900° C., about 1000° C., about 1100° C., about 1200° C., about 1300° C., or any value or range between any two of these values (including endpoints). However, it should be understood that the thermal emitter 305 may emit thermal energy at other temperatures not specifically described herein without departing from the scope of the present disclosure.

The thermophotovoltaic cell 320 may be a solid state device (e.g., a diode) having a radiation absorbing material that absorbs the radiation emitted by the thermal emitter 305 and passed through the radiative energy harvesting system 100 and to generate free charge carriers (e.g., electricity). The radiation absorbing material may be a small bandgap (i.e., higher energy) material. Nonlimiting examples of thermophotovoltaic cells include silicon (Si) TPV cells, germanium (Ge) TPV cells (including low toxicity germanium), gallium antimonide (GaSb) TPV cells, indium gallium arsenide antimonide (InGaAsSb) TPV cells, indium gallium arsenide (InGaAs) TPV cells, and indium phosphide arsenide antimonide (InPAsSb) TPV cells. While the radiation absorbing material may absorb radiation in any wavelength or combination of wavelengths, the radiation absorbing material may be particularly suited for absorbing infrared radiation. Two or more radiation absorbing materials having specific wavelengths of radiation absorption may be used in combination to take advantage of different radiation absorption and charge separation mechanisms. The radiation absorbing material may be configured as, for example, bulk material, thin-film (e.g., inorganic layers, organic dyes, and organic polymers), and/or nanocrystals. The thermophotovoltaic cells may be combined into arrays, strings, modules, or panels.

The harvested energy from the radiation may be used for any purpose and is not limited by this disclosure. In some embodiments, the harvested energy may be used to power other vehicle components. In some embodiments, the harvested energy may be used to charge one or more batteries. Other uses of the harvested energy should generally be understood.

Figure 5:
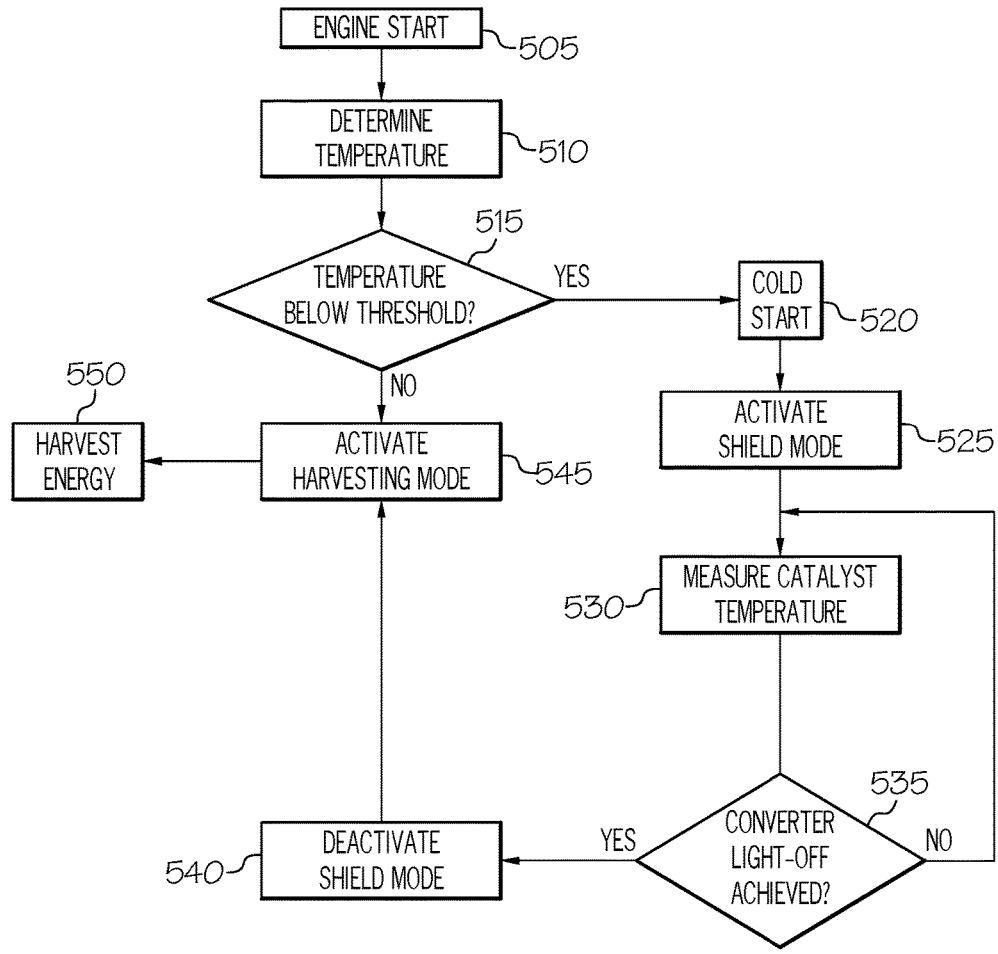
FIG. 5 depicts a flow diagram of an illustrative method of activating one or more modes of a switchable radiative energy harvesting system according to one or more embodiments shown and described herein.

Referring now to FIG. 5, a method of harvesting radiation from one or more vehicle components may begin when the engine of the vehicle is started at step 505. Starting the engine generally refers to the cranking and initial ignition processes for turning on an internal combustion engine.

Once the engine is started, the engine temperature, the ambient temperature, and/or the catalyst temperature may be determined at step 510. Such a determination may be completed by measuring the engine temperature, the ambient temperature, and/or the catalyst temperature with a thermometer or similar device, such as a device that is coupled to or located at a vehicle component, such as the engine, the catalytic convertor, and/or the like. A determination may be made at step 515 as to whether the determined temperature is below a threshold. Such a determination is generally for the purposes of determining whether the start of the engine is a cold start. The threshold is not limited by this disclosure, and may generally be any temperature, particularly a temperature that is recognized as providing conditions for a cold start. For example, the threshold may be about 0° C.

If the temperature is not below the threshold, the engine start is not a cold start and the harvesting mode is immediately activated at step 545. As previously described herein, activation of the harvesting mode generally includes placing the optical filter in a transmitting state by switching the active material and/or the passive material in the radiative energy harvesting system to their respective transmitting states. In embodiments where passive material is used, the triggering temperature that switches the material to a transmitting state may correspond to the threshold temperature for the cold start. That is, if the engine and/or the ambient temperature is above the threshold, the passive material may automatically switch to the transmitting state. In embodiments where active material is used, an electrical current may be applied to or removed from the radiative energy harvesting system to place the active material into a transmitting state.

In some embodiments, it may be desirable to use both active material and passive material such that the harvesting mode is selected at temperatures above the threshold for the cold start, but lower than what is needed for light-off. For example, if the engine, catalyst, and/or ambient temperature is above about 0° C. (e.g., above the threshold) but lower than about 750° C. or about 900° C. (e.g., below the light-off temperature), both active and passive material may be utilized to achieve an appropriate switching. That is, the passive material may not switch to a transmitting state until a temperature greater than the cold start (threshold) temperature is achieved, so the active material is used such that an electrical current can be applied or removed at temperatures lower than the passive material switching temperature (but higher than the threshold temperature) to ensure that the radiative energy harvesting system is appropriately switched to a harvesting mode.

If the temperature is below the threshold, the engine start is determined to be a cold start at step 520. As such, the shield mode is activated at step 525. As previously described herein, activation of the shield mode generally includes placing the optical filter in a reflecting state by switching the active material and/or the passive material in the radiative energy harvesting system to the reflecting state. In embodiments where passive material is used, the material may be in a reflecting state at temperatures that are less than or equal to the threshold temperature for the cold start. That is, if the engine and/or the ambient temperature is at or below the threshold, the passive material may be in the reflecting state. In embodiments where active material is used, an electrical current may be applied to or removed from the radiative energy harvesting system to place the active material into a reflecting state.

At step 530, the temperature of the catalyst is measured. Measuring the catalyst may include using a thermometer or the like at a location within a vehicle system or device containing the catalyst. For example, the catalyst may be measured with a thermometer or the like located at or near the catalytic convertor or another appropriate location.

At step 535, a determination may be made as to whether the catalytic convertor light-off has been achieved. The determination is based on the measuring at step 530. That is, the measured temperature at step 530 is used to determine whether the catalyst has been heated to a particular temperature in which the catalyst is appropriately operating and is effective in reducing tailpipe hydrocarbons, carbon monoxide, and oxides of nitrogen emissions. As previously described herein, such a temperature may be, for example, a temperature greater than 750° C., a temperature greater than 900° C., a temperature of about 900° C. to about 1300° C. and/or the like. Other temperatures that are suitable for light-off that are not specifically described herein may be understood.

If the catalytic convertor light-off has not been achieved (e.g., the catalyst has not yet reached the particular temperature), the temperature of the catalyst may continue to be measured at step 530 and the determination at step 535 may be continuously be made again until it has been determined that light-off has been achieved.

If the catalytic convertor light-off has been achieved (e.g., the catalyst has reached the particular temperature), the shield mode may be deactivated at step 540 and the harvesting mode may be activated at step 545 and the energy from the radiation may be harvested at step 550. That is, the optical filter may be placed (e.g., switched) to a transmitting state by switching the active material and/or the passive material in the radiative energy harvesting system to their respective transmitting states. In embodiments where passive material is used, the triggering temperature that switches the material to from a shield state to a transmitting state may correspond to the light-off temperature. That is, if the engine and/or the ambient temperature is above about 750° C., above about 900° C., or from about 900° C. to about 1300° C., the passive material may automatically switch to the transmitting state. In embodiments where active material is used, an electrical current may be applied to or removed from the radiative energy harvesting system to place the active material into a transmitting state.

Energy may be harvested at step 550 as long as possible such that the system harvests as much energy as possible. In some embodiments, harvesting may continue as long as the engine is running. In some embodiments, harvesting may continue as long as the catalyst remains above a particular temperature, such as the light-off temperature or above the cold start threshold temperature. In such embodiments, harvesting may be able to continue even after the engine has been shut off, but the temperature remains sufficiently high.

Example—Testing Effectiveness of Switchable Radiative Energy Harvesting System

Figure 6:
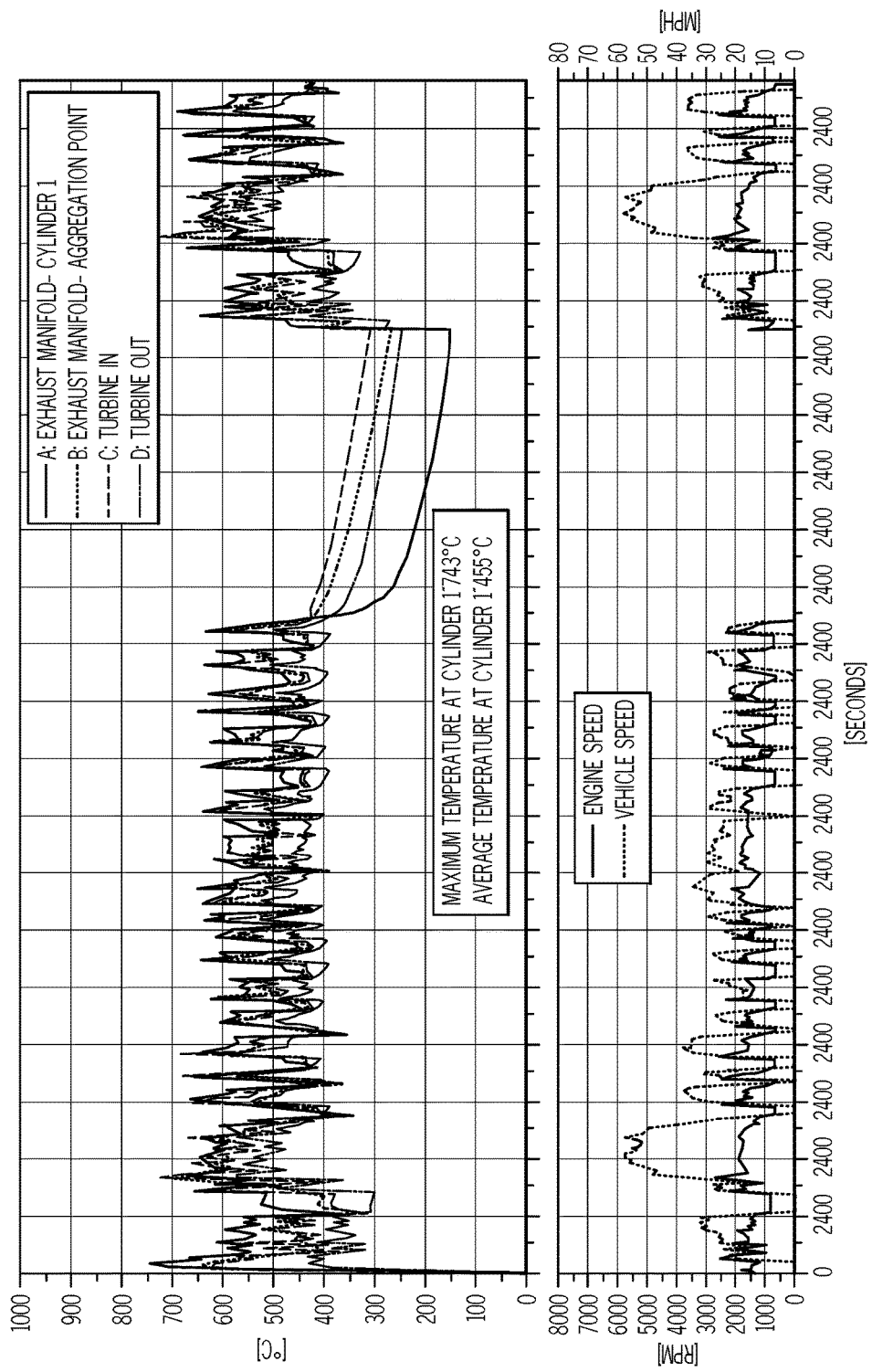
FIG. 6 is a graphical depiction of temperature variation in exhaust gases according to one or more embodiments shown and described herein.
Figure 7:
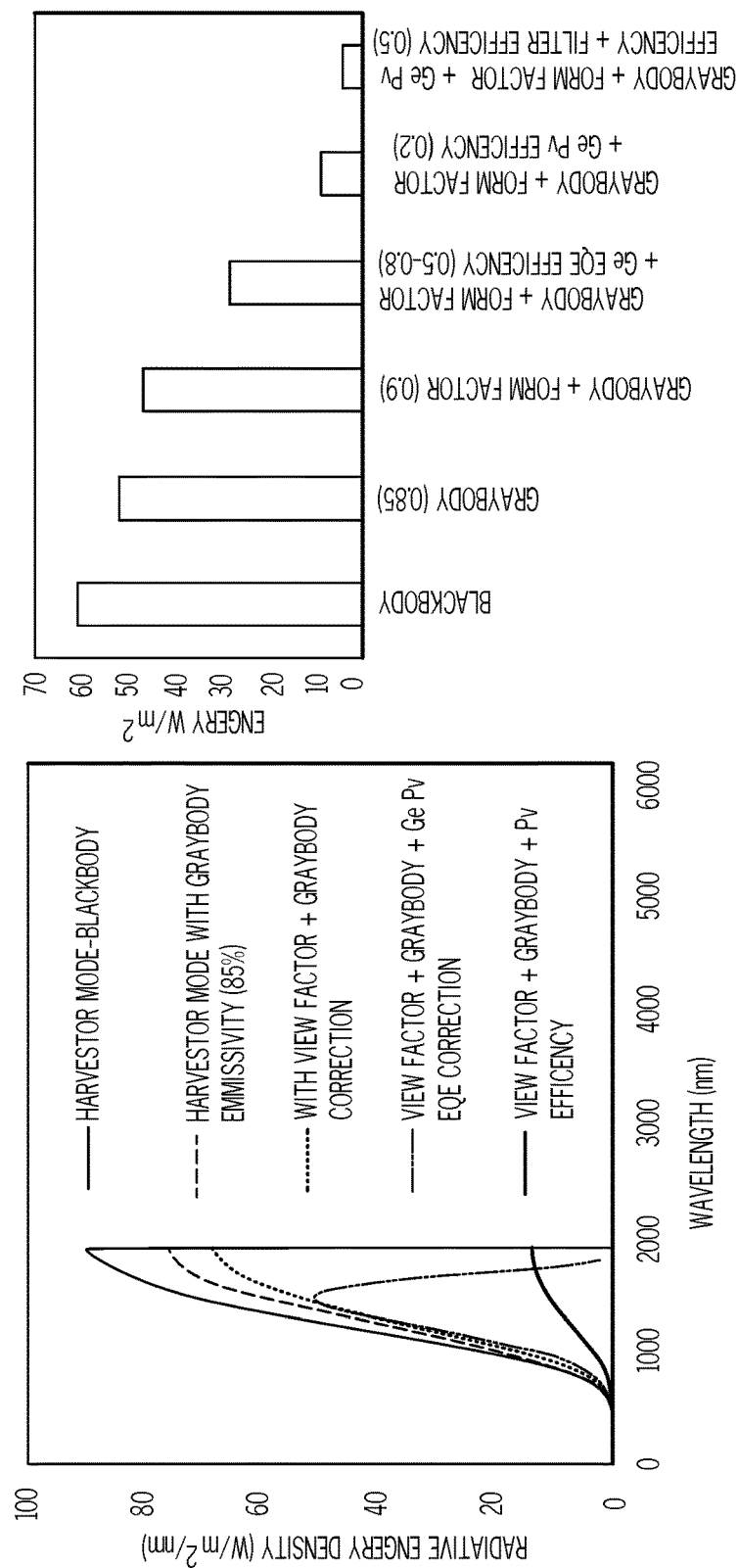
FIG. 7 is a graphical depiction of the potential thermal energy recovery from thermophotovoltaic cells according to one or more embodiments shown and described herein.

An exhaust gas temperature variation for a typical EPA profile for a 2015 vehicle incorporating a switchable radiative energy harvesting system applied to an exhaust gas manifold and catalytic converter was assessed as shown in FIG. 6. As shown in FIG. 6, the maximum exhaust temperature may be as high as 743° C. for a given EPA cycle and may reach as high as 900° C. depending upon the ambient temperature. After determining the exhaust gas temperature and location along exhaust pipe, preliminary analysis using a COMSOL Multiphysics® (COMSOL Inc., Burlington, Mass.) simulation was performed to estimate energy recovery from the TPV cells. An exhaust temperature of 1200° C. is assumed in the calculation. The graph on the left side of FIG. 7 shows the effect of various inefficiencies (material properties such as emissivity along with black body-radiation) on the overall reduction in the radiation energy density while the bar chart on the right side of FIG. 7 provides the corresponding energy per unit area. Considering these factors in the harvesting mode, about 4.6 KW/m$^2$ of energy may be harvested. If the radiative energy harvesting system is cylindrical and has dimensions of about 10 cm in diameter× about 30 cm length, the area of the system is about 0.18 m$^2$, which corresponds to a harvesting capacity of about 0.86 KW. If the exhaust gas temperature is reduced to 900° C., the wattage decreases to about 0.153 KW. As a result, the switchable radiative energy harvesting system was effective in allowing a cold start to occur, and subsequently harvesting energy from the exhaust of the vehicle.

Accordingly, it should now be understood that the system described herein is effective in allowing thermal energy to be used during a cold start to achieve catalyst light-off, and once light-off has been achieved, switching to an energy harvesting mode to effectively harvest energy from the radiation emitted by the catalyst. Such a system is achieved by including an optical filter that utilizes active and passive materials that are switchable between a reflective state and a transmitting state. As a result, the system is more efficient than existing systems in achieving light-off after a cold start, while still harvesting as much energy as possible after the cold start.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A switchable radiative energy harvesting system comprising:
    an optical filter comprising at least one of an active material and a passive material,
    wherein the optical filter is switchable between a shield mode and a harvesting mode such that the at least one of the active material and the passive material is in:
        a reflecting state during the shield mode such that the optical filter blocks passage of radiation from a thermal emitter selected from a vehicle engine, an exhaust manifold of a vehicle, a catalytic converter of a vehicle, or a thermally conductive conduit of a vehicle to a thermophotovoltaic cell, and
        a transmitting state during the harvesting mode such that that the optical filter allows the radiation to pass from the thermal emitter to the thermophotovoltaic cell.

2. The switchable radiative energy harvesting system of claim 1, wherein the optical filter is arranged in a stack having the active material and the passive material layered between one another.

3. The switchable radiative energy harvesting system of claim 1, wherein the optical filter comprises the active material and the passive material.

4. The switchable radiative energy harvesting system of claim 1, further comprising a first contact, a second contact, and an electrical conductor electrically coupled between the first contact and the second contact, wherein the optical filter is positioned between the first contact and the second contact.

5. The switchable radiative energy harvesting system of claim 4, wherein:

the optical filter comprises the active material; and the active material is activated by applying an electrical current to the electrical conductor, thereby causing the active material to switch between the reflecting state and the transmitting state.

6. The switchable radiative energy harvesting system of claim 1, wherein:

the optical filter comprises the active material; and the active material is comprised of an electrochromic material.

7. The switchable radiative energy harvesting system of claim 1, wherein:

the optical filter comprises the active material; and the active material comprises nickel oxide.

8. The switchable radiative energy harvesting system of claim 1, wherein:

the optical filter comprises the passive material; and the passive material switches between the reflecting state and the transmitting state based on a temperature of the passive material.

9. The switchable radiative energy harvesting system of claim 1, wherein:

the optical filter comprises the passive material; and the passive material is comprised of a thermochromic material.

10. The switchable radiative energy harvesting system of claim 1, wherein:

the optical filter comprises the passive material; and the passive material comprises vanadium dioxide.

11. The switchable radiative energy harvesting system of claim 1, wherein the switchable radiative energy harvesting system is coupled between the exhaust manifold and the catalytic convertor of the vehicle.

12. The switchable radiative energy harvesting system of claim 1, wherein the switchable radiative energy harvesting system is integrated with at least a portion of the catalytic convertor of the vehicle.

13. A method of harvesting radiation from one or more components of a vehicle, the method comprising:

determining that an engine of the vehicle is undergoing a cold start;

activating a shield mode on a switchable radiative energy harvesting system such that radiation from a thermal emitter component of the vehicle is used to achieve light-off of a catalytic convertor, the thermal emitter component selected from a vehicle engine, an exhaust manifold of the vehicle, the catalytic converter of the vehicle, or a thermally conductive conduit of the vehicle; and when light-off of the catalytic convertor is achieved, switching from the shield mode to a harvesting mode such that the radiation from the thermal emitter is passed to a thermophotovoltaic cell, the thermophotovoltaic cell obtaining energy from the radiation.

14. The method of claim 13, wherein activating the shield mode comprises applying an electrical current to the switchable radiative energy harvesting system to cause an active material in an optical component of the switchable radiative energy harvesting system to switch to a reflecting state that reflects the radiation from the thermal emitter and prevents passage to the thermophotovoltaic cell.

15. The method of claim 13, wherein switching from the shield mode to the harvesting mode comprises applying an electrical current to the switchable radiative energy harvesting system to cause an active material in an optical component of the switchable radiative energy harvesting system to switch to a transmitting state that allows the radiation to pass from the thermal emitter to the thermophotovoltaic cell.

16. The method of claim 13, wherein activating the shield mode is a result of a temperature of the passive material being below a threshold such that a passive material in an optical component of the switchable radiative energy harvesting system is switched to a reflecting state that reflects the radiation from the thermal emitter and prevents passage to the thermophotovoltaic cell.

17. The method of claim 16, wherein the threshold is from about −100° C. to about 1000° C.

18. The method of claim 13, wherein switching from the shield mode to the harvesting mode is a result of a temperature of the passive material being above a light-off temperature such that a passive material in an optical component of the switchable radiative energy harvesting system is switched to a transmitting state that allows the radiation to pass from the thermal emitter to the thermophotovoltaic cell.

19. The method of claim 13, further comprising:

determining that the engine of the vehicle is not undergoing the cold start; and switching to the harvesting mode.

20. A system comprising:

a thermal emitter selected from a vehicle engine, an exhaust manifold of a vehicle, a catalytic converter of a vehicle, or a thermally conductive conduit of a vehicle;

a thermophotovoltaic cell; and a switchable radiative energy harvesting system positioned between the thermal emitter and the thermophotovoltaic cell, the switchable radiative energy harvesting system comprising:

a first contact, a second contact, an electrical conductor electrically coupled between the first contact and the second contact, and an optical filter having an active material and a passive material, wherein the optical filter is switchable between a shield mode and a harvesting mode such that the active material and the passive material are in:

a reflecting state during the shield mode such that the optical filter blocks passage of radiation from the thermal emitter to the thermophotovoltaic cell, and a transmitting state during the harvesting mode such that that the optical filter allows the radiation to pass from the thermal emitter to the thermophotovoltaic cell.

* * * * *

UNITED STATES PATENT AND TRADEMARK OFFICE
CERTIFICATE OF CORRECTION

PATENT NO. : 10,174,659 B2
APPLICATION NO. : 15/205018
DATED : January 8, 2019
INVENTOR(S) : Shailesh N. Joshi, Debasish Banerjee and Shashi Honnikoppa It is certified that error appears in the above-identified patent and that said Letters Patent is hereby corrected as shown below:

On the Title Page

Item (73), Assignee, delete "Toyota Manufacturing Engineering & Manufacturing North America, Inc." and insert --Toyota Motor Engineering & Manufacturing North America, Inc.--, therefor.

Item (57), Abstract, Line 10, delete "that that" and insert --that--, therefor.

In the Specification

In Column 1, Line 43, delete "that that" and insert --that--, therefor.

In Column 2, Line 3, delete "that that" and insert --that--, therefor.

In the Claims

In Column 10, Claim 1, Line 50, delete "that that" and insert --that--, therefor.

In Column 12, Claim 20, Line 55, delete "that that" and insert --that--, therefor.

Signed and Sealed this
Twenty-sixth Day of February, 2019

Andrei Iancu
*Director of the United States Patent and Trademark Office*